No. 749,259. Patented January 12, 1904.

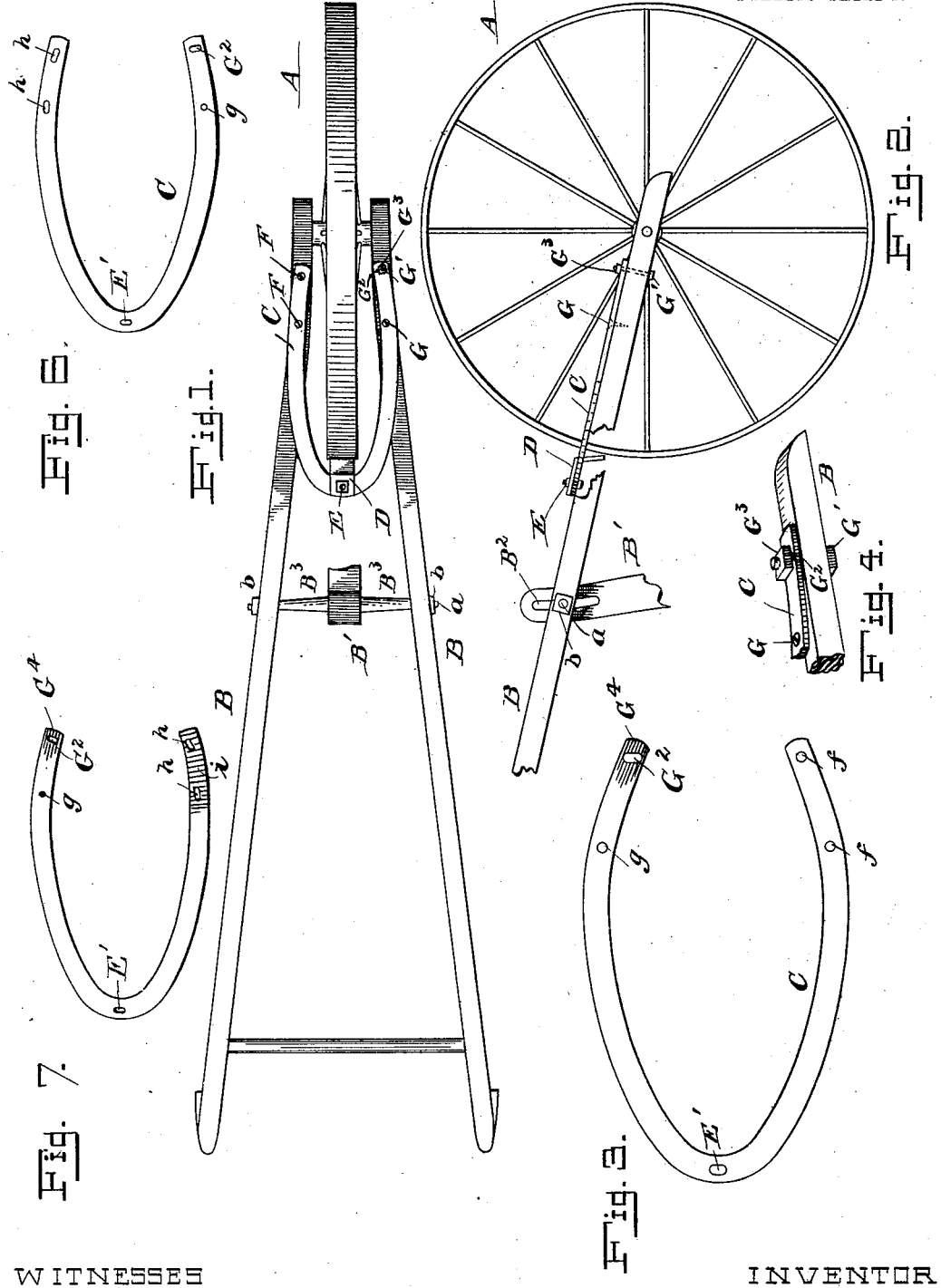

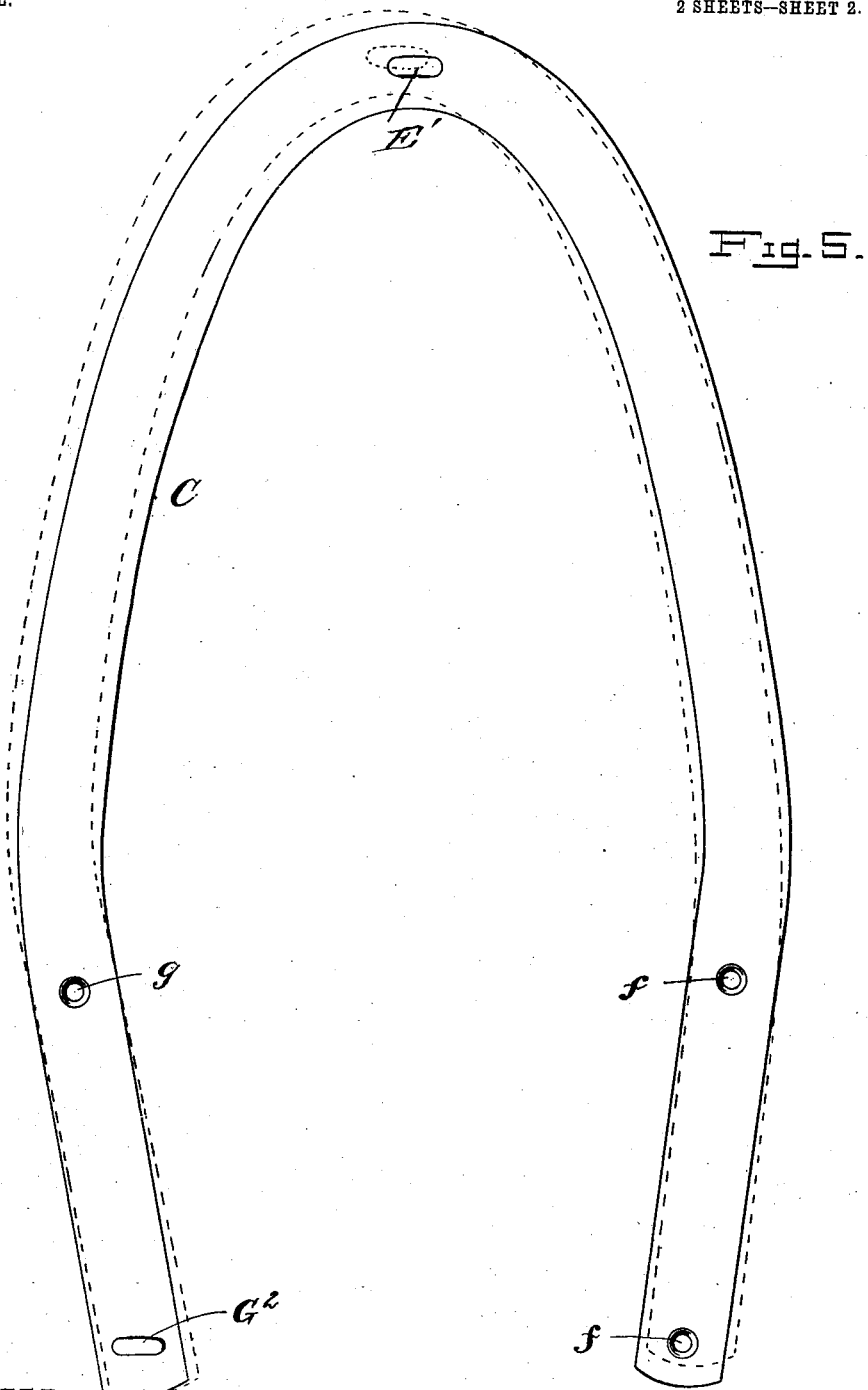

UNITED STATES PATENT OFFICE.

GIDEON W. COLE, OF CANTON, ILLINOIS.

GARDEN-PLOW.

SPECIFICATION forming part of Letters Patent No. 749,259, dated January 12, 1904.

Application filed February 17, 1903. Serial No. 143,879. (No model.)

*To all whom it may concern:*

Be it known that I, GIDEON W. COLE, a citizen of the United States, and a resident of Canton, in the county of Fulton and State of Illinois, have invented Improvements in Garden-Plows, of which the following is a specification.

This invention relates to improvements in plows, and more particularly to that class of plows known as "hand-plows" or "garden-plows."

The object of the invention is to furnish a new means for "ranging" or lining the wheel of the plow so as to bring it in proper relation to the handles in which said wheel has its bearings.

The invention relates to certain details of construction also, which will be clearly described, and pointed out in the claims.

In the accompanying drawings, Figure 1 is a plan view of the garden-plow as I construct it. Fig. 2 is a side view of a portion thereof. Fig. 3 is a view of the under side of an adjusting-yoke. Fig. 4 is a perspective view of a portion of one of the plow-handles, showing a portion of the adjusting-yoke thereon. Fig. 5 is a top view of the adjusting-yoke much enlarged over that shown in the other figures. Fig. 6 is a top view of the same, showing slightly-different arrangement of the holes therein. Fig. 7 is a view of the under side of the form shown in Fig. 6.

It is the purpose of my invention to somewhat cheapen the construction of garden-plows by improving on the form patented to me August 3, 1869, numbered 93,277. In this patent the handles of the plow extend forward nearly to the rim of the supporting-wheel and the two extremities of such handles are connected by an iron yoke which runs around ahead of the wheel. It is the intention to shorten the handles, thus saving material, and place the yoke behind instead of in front of the wheel and use it for adjusting purposes, whereas heretofore it merely acted to strengthen the handles and hold them rigid.

In the drawings herewith, A indicates the wheel, which may be of any desired form, having bearings in the extremities of the handles B, which diverge toward the rear, as in other implements of this kind. Between the handles is located the usual upright standard, to which the shovel is secured, though not shown. The said standard is represented by B' and is slotted at B² for adjusting purposes. A bolt $a$ passes through the said handles and also through the said slot B², and blocks B³ on said bolt at each side of the upright serve to sustain the latter wherever placed by the tightening of the nuts $b\ b$.

My improvement may be understood now by reference particularly to Fig. 1. I provide a yoke C, constructed in the form shown, or substantially so, preferably of malleable iron and about three-sixteenths of an inch in thickness, although the exact thickness is not of importance. At one extremity of the yoke are two holes $f\ f$, Figs. 3 and 5, which, together with screws F F, serve to secure said extremity to one of the handles, as shown in Fig. 1. The opposite extremity of the yoke is provided with a screw-hole $g$, through which is passed a screw G into the handle, and a slot G² at the extreme end is likewise provided. A bolt G' is secured in a stationary manner in the handle with its threaded end pointing upward through the said slot G² and is provided with a nut G³ for tightening purposes. A scraper D is provided at the rear of the wheel and is secured to the yoke C by means of a bolt E. This member serves to keep the wheel cleared of the dirt which would otherwise accumulate thereon.

Let it be supposed that after long use the wheel A gets out of line between the handles, or rather is not central therein. In such a case one of the handles B will be found extending forward of the other, thereby turning the wheel and carrying its rim nearer to such extended handle by pushing the axle forward. In order to correct this and carry the wheel to its proper central position, the screws F F are removed and the nut G³ loosened. This permits the yoke to be moved on the screw G as a pivot and liberates both handles B, so that they will be free to "rack" independent of one another. Now by sighting along the wheel, using the upright or standard B' as a guide, said wheel is centered by sighting along it toward the standard. However, other methods will readily suggest themselves to the practical person for gaining this end. When the wheel is thus centered, which action racks the handles in the direction of their length, the yoke is moved on the screw G until it is in proper position, as near as can be judged. Then the nut $G^3$ is tightened to prevent movement of the said yoke on the said screw G. The opposite side of the yoke is then sprung until its holes $f\,f$ coincide with the screw-holes in the handle, and is there held until said screws are inserted to secure the parts firmly together once more. These screws are inserted only, however, if the wheel is found to be in proper position after straining the yoke. If not, the nut $G^3$ is loosened and the yoke swung in a direction that will bring the wheel perfectly in line when said nut $G^3$ is tightened and the yoke has been again strained to insert the said screws F F. This operation is quite simple in practice and is unfailing in its work and effectiveness. At $G^4$, Fig. 3, a number of corrugations are formed, extending at right angles to the length of the slot $G^2$. This provides a roughened surface for the under side of the yoke extremity, so that there will be less tendency for the member to slip at this point during the straining operation described above, said corrugations engaging with the wood of the handle, as will be understood.

In Figs. 6 and 7 are shown the upper and under side of the yoke, which is of the same shape as already described, but in lieu of the holes $f\,f$ is provided with two slots $h\,h$, which are merely arcs of circles described from the hole $g$, corresponding with that shown in Figs. 3 and 5; otherwise the yoke is the same as described hereinbefore, except that corrugations $i$, similar to those at $G^4$, Fig. 3, are placed at right angles to the length of the said slots $h\,h$. This form of yoke serves in the same capacity as that in Figs. 1 and 3; but instead of using the screws F F bolts (not shown) are substituted therefor, which may have nuts thereon corresponding with $G^3$ in Fig. 1. Now by loosening these nuts the yoke may be shifted or sprung, merely loosening said nuts to permit of the necessary movement; then by tightening them the yoke is secured in position. The roughened portion at $i$ serves to prevent movement of the end of the yoke after being secured in the desired position.

It is evident that other forms of the yoke may be constructed and various means adopted for adjusting the handles and wheel without departing from the spirit and intent of my invention, since it is desired to secure protection on means of some description for permitting adjustment of the handles and securing them in the position placed.

My improved form of garden-plow is cheaper than heretofore constructed for the reason that, as before stated, the handles are made much shorter, so that more of these members can be cut out of a piece of wood of given size than heretofore possible. The yoke C is merely a substitute for the yoke which originally passed around ahead of the wheel, so that no extra cost of any appreciable difference is created as to that member, except in the difference in material. Less time is necessary in assembling the plow, for the reason that all parts are put together without especial reference to exactness of adjustment, so that when the yoke is put in place the wheel can be alined in a moment or two by the method outlined above, and the plow is ready for market. The implements thus produced are at any time easily adjusted even by a novice having no knowledge of such devices. The construction is of advantage if only for this reason.

When using the yoke of the old form, which passes ahead of the wheel, that member is much in the way when transporting the plow from field to field or to and from the tool-shed in which it may be kept from the weather, for the reason that in moving the implement about it is customary to turn it upside down in carrying the plow away from the ground, so that it will not catch, and in so doing the yoke then often catches in rubbish or weeds and sometimes sticks into the ground, and even when carried right side up, as when in use in the field, said yoke sometimes causes much trouble by catching on or breaking the growing vegetation under cultivation. The advantages, then, of having the yoke behind the wheel and higher up than heretofore are evident.

Having described my invention, I claim—

1. In a garden-plow, the handles thereof constituting the plow-frame, a wheel journaled between the frame ends, a U-shaped yoke lying upon the frame in a plane substantially perpendicular to the plane of the wheel and inclosing said wheel at its rear, means for securing one end of the yoke in a stationary manner to its respective frame end, and means at the other end of the yoke for holding it after adjustment for the purposes described.

2. In a garden-plow the handles thereof constituting the plow-frame, a wheel journaled between the frame ends, a U-shaped yoke lying upon the frame in a plane substantially perpendicular to the plane of the wheel, said yoke pivoted at one end on its respective frame end, means for holding that end from movement on its pivot after adjustment and means at the opposite extremity of the yoke for securing that extremity to the frame in a stationary manner all for the purposes set forth.

3. In a garden-plow, the handles B forming the plow-frame, the wheel A carried between the handles, the U-shaped yoke C having one end attached to one of the handles in a stationary manner, the other end adjustable on the handle, all substantially as shown to permit a shifting movement of the handles forward or back for shifting the wheel-axle and centering the wheel between them as set forth.

4. In a plow of the character described the handles B, the wheel A mounted between the said handles, the yoke C having each extremity attached to one of the handles B and means for securing the yoke in the position placed, said yoke being capable of adjustment to "rack" the handles in the direction of their length to carry the wheel into alinement as set forth and described.

5. In a plow of the character described the handles B forming the frame of the plow, the wheel A mounted between the said handles, the U-shaped yoke attached to the handles in the manner illustrated, the bolt G' and screw G for securing one end of the yoke to one of the handles and the screws F F for securing the other end of said yoke to the opposite handle all being arranged substantially as set forth and described.

6. In a garden-plow the combination of the handles B forming the frame of the plow, the wheel A located between and attached to the handles for carrying the same, the U-shaped yoke C having one of its ends attached to each of the handles B, the holes $f$, $f$, $g$ and $G^2$ in said yoke substantially as described, the screws F, F, G, and bolt G' for securing the yoke in place and the scraper D attached to the yoke for engaging the rim of the wheel all as set forth and described.

GIDEON W. COLE.

Witnesses:
    GEO. B. MILLS,
    BERT. D. SULLIVAN.